US010343468B2

(12) United States Patent
Cyllik et al.

(10) Patent No.: US 10,343,468 B2
(45) Date of Patent: Jul. 9, 2019

(54) METHOD FOR MONITORING TIRE STATES AND/OR SENSOR STATES AND A MONITORING SYSTEM THEREFOR

(71) Applicant: Continental Reifen Deutschland GmbH, Hannover (DE)

(72) Inventors: Adrian Cyllik, Hannover (DE); Joerg Hanna, Roedlinghausen (DE); Florin Enache, Timisora (RO)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 15/871,761

(22) Filed: Jan. 15, 2018

(65) Prior Publication Data

US 2018/0134101 A1    May 17, 2018

Related U.S. Application Data

(63) Continuation of application No. PCT/EP2016/061871, filed on May 26, 2016.

(30) Foreign Application Priority Data

Jul. 14, 2015 (EP) ..................................... 15176562

(51) Int. Cl.
*B60C 23/00* (2006.01)
*B60C 23/04* (2006.01)

(52) U.S. Cl.
CPC ........ *B60C 23/0415* (2013.01); *B60C 23/009* (2013.01); *B60C 23/0401* (2013.01); *B60C 23/0455* (2013.01); *B60C 23/0466* (2013.01)

(58) Field of Classification Search
CPC .............. B60C 23/0415; B60C 23/009; B60C 23/0401; B60C 23/0455; B60C 23/0466
See application file for complete search history.

(56) References Cited

U.S. PATENT DOCUMENTS 5,793,285 A * 8/1998 Wehinger .............. B60C 23/067
116/34 R
5,891,277 A * 4/1999 Bachhuber .............. B60S 5/046
141/197

(Continued)

OTHER PUBLICATIONS

International Search Report dated Aug. 5, 2016 of international application PCT/EP2016/061871 on which this application is based.

*Primary Examiner* — Joseph H Feild
*Assistant Examiner* — Rufus C Point
(74) *Attorney, Agent, or Firm* — Walter Ottesen, P.A.

(57) ABSTRACT

A method is for monitoring tire states and/or sensor states. The method includes the steps: a) capturing whether at least one tire sensor module for measuring tire states and/or sensor states is present in a monitoring region; b) determining whether the captured tire sensor module is unknown; c) evaluating data messages from the at least one captured and unknown tire sensor module, the evaluation including at least comparing at least one tire state transmitted via the data message with a limit value therefor and/or monitoring a sensor state of the tire sensor module transmitted via the data message; and, d) outputting a warning signal if a tire state exceeds or undershoots the respective limit value in order to indicate that a tire state of a tire assigned to the at least one unknown tire sensor module is critical and/or if a critical sensor state is detected.

2 Claims, 2 Drawing Sheets

(56) References Cited

U.S. PATENT DOCUMENTS

| | | | |
|---|---|---|---|
| 6,650,986 B1* | 11/2003 | Burgdorf | B60T 8/1725 701/70 |
| 6,802,213 B1* | 10/2004 | Agrotis | B60C 23/061 73/146 |
| 2002/0014115 A1* | 2/2002 | Young | B60C 23/0416 73/146 |
| 2002/0030590 A1* | 3/2002 | Dieckmann | B60D 1/62 340/431 |
| 2002/0149477 A1* | 10/2002 | Desai | B60C 23/0416 340/442 |
| 2003/0030553 A1* | 2/2003 | Schofield | B60C 23/0416 340/442 |
| 2003/0145650 A1* | 8/2003 | Juzswik | B60C 23/0416 73/146 |
| 2003/0197603 A1* | 10/2003 | Stewart | B60C 23/0416 340/442 |
| 2004/0155764 A1* | 8/2004 | Ichinose | B60C 23/0408 340/447 |
| 2005/0044946 A1* | 3/2005 | Agrotis | B60C 23/0408 73/146.5 |
| 2006/0220805 A1* | 10/2006 | Thomas | B60C 23/0416 340/426.33 |
| 2007/0018804 A1 | 1/2007 | Strache et al. | |
| 2007/0113635 A1* | 5/2007 | Corniot | B60C 23/0408 73/146 |
| 2008/0164988 A1* | 7/2008 | Dekeuster | B60C 23/0408 340/442 |
| 2009/0315697 A1* | 12/2009 | Huang | B60C 23/0408 340/447 |
| 2010/0300192 A1 | 12/2010 | Isomura | |
| 2011/0118989 A1* | 5/2011 | Morinaga | B60C 11/24 702/34 |
| 2013/0106596 A1* | 5/2013 | Mouchet | B60C 23/02 340/445 |
| 2013/0131915 A1* | 5/2013 | Masago | B60C 19/00 701/33.9 |
| 2014/0210606 A1* | 7/2014 | Katiba | B60C 23/0415 340/442 |
| 2016/0311273 A1* | 10/2016 | Zaroor | B60C 23/0479 |

* cited by examiner

METHOD FOR MONITORING TIRE STATES AND/OR SENSOR STATES AND A MONITORING SYSTEM THEREFOR

CROSS REFERENCE TO RELATED APPLICATIONS

This application is a continuation application of international patent application PCT/EP2016/061871, filed May 26, 2016, designating the United States and claiming priority from European application 15176562.5, filed Jul. 14, 2015, and the entire content of both applications is incorporated herein by reference.

FIELD OF THE INVENTION

The invention relates to a method for monitoring tire states and/or sensor states, in particular using tire sensor modules, and to a monitoring system for monitoring tire states and/or sensor states.

BACKGROUND OF THE INVENTION

Tire sensor modules or transponders which are arranged, for example, in the interior of a tire are known for the purpose of monitoring tire states, in particular a tire pressure, of tires of a commercial vehicle. Such tire sensor modules are configured to capture, in a fixed position, a tire pressure, mechanical stress states in the tire and a tire temperature, to process them and to transmit them by radio-frequency (RF) radio signal to an electronic control unit (ECU) of a monitoring system via a data message. The control unit receives the data message via a receiving module of the monitoring system and, on the basis of limit values, outputs a warning signal to the driver, for example if a tire pressure below a limit value has been determined at one of the tires. US 2007/0018804 discloses an example of such a tire sensor module. Furthermore, a sensor state can be transmitted from a tire sensor module to the control unit via the data message, for example a sensor defect or the presence of a loose tire sensor module, and can be output to the driver via the warning signal.

If the tires of a two-part commercial vehicle including a towing vehicle and a trailer vehicle, that is, a semi-trailer or trailer, are monitored, the tire sensor modules of the towing vehicle are already stored in advance in the control unit by means of a sensor identifier or a sensor identification, the respective tire sensor module being uniquely assigned to a tire of the towing vehicle. If a trailer vehicle is connected to the towing vehicle for a relatively long period, the tire sensor modules of this trailer vehicle may likewise be stored in the control unit and may be uniquely assigned to the individual tires. However, if the trailer vehicle is frequently changed, the tire sensor modules of the trailer vehicle are incorporated by the monitoring system by means of automatic trailer detection. As a result, if the trailer vehicle is changed, there is no need for manual storage, but the respective tire sensor modules of the tires of the trailer vehicle cannot be assigned to a particular tire in a fixed position.

For automatic trailer detection, the monitoring system in a moving commercial vehicle monitors a monitoring region for data messages from any arbitrary tire sensor modules which are not yet known to the control unit. If a new or unknown tire sensor module is captured, it is determined and checked, over a relatively long period of up to 30 minutes for example, whether or not the unknown tire sensor module belongs to the driver's own trailer vehicle. This is carried out, for example, by checking whether or not the tire sensor module concomitantly moves with the towing vehicle over this period by monitoring whether a particular number of data messages are transmitted by this unknown tire sensor module over this period. Once the trailer detection has been concluded, that is, affiliation of the tire sensor module or else of a plurality of tire sensor modules to the driver's own trailer vehicle is determined, the monitoring system is ready to also process and evaluate the corresponding data messages from the tire sensor module and to output warning signals, for example, on the basis of the captured tire states.

The disadvantage in this case is that the incorporation of all tire sensor modules which are detected in the monitoring region and are assigned to the driver's own trailer vehicle takes a very long time and the driver of the commercial vehicle therefore does not receive any feedback relating to the state of the tires of his trailer or relating to the state of the tire sensor module, for example in the event of a defective sensor, until the trailer detection has been completed. In addition, the vehicle must be moving. As a result, the situation can occur in which, if the trailer vehicle is changed, the journey is continued with a defective tire or a defective sensor, as a result of which critical driving situations may arise.

SUMMARY OF THE INVENTION

It is an object of the invention to provide a method for monitoring tire states and/or sensor states, which method makes it possible to monitor the state of tires, in particular of a driver's own trailer vehicle, and/or the state of sensors for measuring the tire states of tires, in particular of the driver's own trailer vehicle, in a short time in order to be able to avoid critical driving situations.

This object can, for example, be achieved via a method for monitoring at least one of tire states and sensor states. The method includes the steps of: a) capturing whether at least one tire sensor module for measuring at least one of the tire states and sensor states is present in a monitoring region; b) determining whether the at least one captured tire sensor module is unknown; c) evaluating data messages (S1) from the at least one captured and unknown tire sensor module, the evaluation comprising at least one of comparing at least one tire state transmitted via a data message (S1) with a limit value (GW) therefor and monitoring a sensor state of the tire sensor module transmitted via the data message (S1); and, d) outputting a warning signal (S2) if at least one tire state exceeds or undershoots the respective limit value (GW) in order to indicate that a tire state of a tire assigned to the at least one unknown tire sensor module is critical and a critical sensor state is detected.

It is a further object of the invention to provide a monitoring system for monitoring tire states and/or sensor states.

This object can, for example, be achieved via a monitoring system for monitoring at least one of tire states and/or sensor states. The monitoring system includes: a control unit; a receiving module; the control unit being configured to capture, via the receiving module, whether at least one tire sensor module for measuring tire states is present in a monitoring region of the receiving module; the control unit being further configured to determine whether the at least one captured tire sensor module is unknown to the control unit; the control unit being further configured to evaluate a data message (S1) from the captured and unknown tire sensor module, the evaluation comprising at least comparing at least one tire state transmitted via the data message (S1) with a limit value (GW) therefor and/or monitoring a sensor state of the tire sensor module; and, the control unit being further configured to output a warning signal (S2) if at least one of: a tire state exceeds or undershoots the limit value (GW) in order to indicate that a tire state of a tire assigned to the tire sensor module is critical, and, there is a critical sensor state.

An aspect of the invention therefore provides for all tire sensor modules captured in a monitoring region of a driver's own commercial vehicle with a coupled trailer vehicle to be monitored. This means, for example, that data messages transmitted by all tire sensor modules captured in the monitoring region are already evaluated before it has been determined whether the captured tire sensor modules are assigned to the driver's own trailer vehicle.

According to an aspect of the invention, it is thus recognized that immediate evaluation after capturing a tire sensor module is more important than initially determining whether a captured tire sensor module belongs to the driver's own trailer vehicle. The method is advantageously used to also be able to monitor, directly after a new trailer vehicle has been coupled or at the beginning of a journey, tire states of the tires of this trailer vehicle or sensor states of the tire sensor modules on the tires of the new trailer vehicle, the evaluation starting, for example, as soon as the ignition of the vehicle is actuated, that is, even before the vehicle begins to move.

During capture, it is first of all determined in this case whether a data message is received from an unknown tire sensor module. Unknown means that the tire sensor module in the monitoring region is not assigned, for example, to the driver's own towing vehicle, a sensor identifier or sensor identification transmitted by the tire sensor module via the data message being able to be compared for this purpose, for example.

The monitoring or evaluation according to an aspect of the invention further includes comparing the data message, which is received from the captured and as yet unknown tire sensor module and characterizes the tire states and/or the sensor state, with a limit value, for example, or monitoring for critical sensor states.

Tire states are understood as meaning, in particular, a tire temperature, mechanical stress states, a tread depth, a wheel load or a tire pressure which is/are measured by the tire sensor module, which is preferably arranged in the interior of the tire, is/are processed, and is/are wirelessly transmitted via the data message, preferably using a radio-frequency (RF) radio signal, to the control unit (ECU) of a monitoring system. In this case, a tire sensor module transmits a data message containing, in particular, the tire states of the corresponding tire and the sensor state, for example approximately every 16 seconds. The control unit compares these tire states and outputs a warning signal to the driver, for example if the tire temperature exceeds a desired temperature or the tire pressure undershoots a desired pressure, with the result that the driver can react accordingly. In this case, the capture and comparison can be carried out by appropriate software on the control unit.

A critical sensor state is understood as meaning, in particular, a defect of the tire sensor module or a loose tire sensor module. If a critical sensor state is detected by the tire sensor module, this is output via the data message. The control unit monitors the data message with regard to a critical sensor state and outputs a corresponding warning signal to the driver in that case. In addition, the control unit can also monitor the data messages with regard to poor reception by monitoring, for example, temporarily absent data messages with a particular sensor identification.

This achieves the advantage that tire states which are critical to driving or tire states which can damage the tire, for example an increased tire temperature or an excessively low tire pressure, and critical sensor states can be detected immediately after a tire sensor module has been captured. The driver can then check whether a tire or a tire sensor module of his own trailer vehicle is affected or whether an adjacent commercial vehicle, that is, an adjacent towing vehicle and/or trailer vehicle, in the monitoring region has a defective tire or a defective tire sensor module, for example. Safety increases since it is possible to react immediately in the event of a warning signal and the risk of the driver continuing his journey after the trailer vehicle has been changed or actually beginning his journey with a defective tire or a defective tire sensor module on the trailer is minimized. Therefore, after the trailer has been changed or if resuming the journey, the driver advantageously does not have to wait until it has been determined whether it is a tire sensor module of the driver's own trailer.

According to an advantageous embodiment, the determination of whether the captured and unknown tire sensor module is assigned to the driver's own trailer vehicle additionally takes place in the background, while the driver's own commercial vehicle is moving. For this purpose, it is preferably monitored and checked whether a particular number of data messages, for example 30 data messages, are received from the same previously unknown tire sensor module over a defined period of, for example, 8 to 10 minutes, only tire sensor modules which are likewise moving being taken into account. For this purpose, the sensor identification which is stored in the tire sensor module and is wirelessly transmitted can be monitored over the period, for example. If a tire sensor module is assigned to the driver's own trailer vehicle, this tire sensor module is buffered as known in the control unit, for example, and is monitored until the trailer detection is started again. This determination is carried out in a parallel manner for all captured and unknown tire sensor modules. Once the assignment of all tire sensor modules for the driver's own trailer module has been concluded, the trailer detection can be switched off in order to restrict the warning signals to the driver's own commercial vehicle. From that time on, only known tire sensor modules are advantageously evaluated.

The limit value for the tire temperature, the mechanical stress state, the tread depth, the wheel load and the tire pressure is advantageously selected for the evaluation according to an aspect of the invention in such a manner that critical driving situations can be avoided, in which case a tire can begin to burn or the tire can slip from the rim in the event of a critical driving situation, for example. However, this is also understood as meaning that the tire may be damaged over time, for example on account of a significantly increased temperature or a significantly excessively low pressure. For this purpose, a limit value of less than or equal to approximately 80% of a desired pressure or greater than or equal to approximately 120% of a desired temperature can be selected, for example. These limit values are reached only in critical exceptional cases if, for example, a tire has been pierced by a foreign body or if a tire locks. A corresponding situation applies to the limit values for the tread depth, the wheel load and the mechanical stress state. The warning signals can also be advantageously restricted to particular sensor states, for example only to a sensor defect, in the event of critical sensor states of the tire sensor module.

This results in the advantage that the number of warning signals can be reduced since, in the case of an excessively small deviation from the corresponding desired value and in the case of an accumulation of commercial vehicles, for example in a parking lot, the number of warning signals is very high since slight fluctuations of the tire pressure, for example, are possible without resulting in a critical driving situation. Furthermore, it may be the case that different desired values are predefined in adjacent vehicles since they have different tire types or have a different load. It is therefore recognized that a greater deviation from the corresponding desired value is more useful for selecting the limit value in order to avoid obtaining an excessive number of warning signals, but at least a critical driving behavior can be prevented.

In this case, the above-mentioned limit values for a critical driving situation advantageously apply only as long as the automatic trailer detection has not yet been concluded. Once the trailer detection has been concluded, the limit values can be set in such a manner that warning messages are also output if a deviation from the limit value or a particular sensor state does not lead to a critical driving situation.

One advantageous embodiment provides for the tire sensor module to capture a movement state and to output it via the data message. In this case, the tire sensor modules are configured to identify, from a measurement of the acceleration, preferably the radial acceleration and/or the tangential acceleration and/or the lateral acceleration, whether the tire sensor module and therefore also the corresponding tire are moving. This information can likewise be wirelessly transmitted to the control unit via the data message.

This makes it possible to achieve the advantage that the evaluation according to an aspect of the invention can take place in the control unit on the basis of the movement state. In this case, a standstill or a slow journey with, for example, a speed of the tire sensor module corresponding to a vehicle speed of less than 20 km/h, or a driving state, for example with a vehicle speed of 20 km/h or more, are possible as movement states, for example.

Accordingly, provision may be advantageously made for the tire states output via the data message to be compared with the limit value or for a critical sensor state to be monitored only when the driver's own towing vehicle has the same movement state as the tire sensor module whose tire states or sensor states are intended to be assessed. If the driver's own towing vehicle is therefore at a standstill or moving slowly, only tire states or sensor states from tire sensor modules which are likewise moving slowly or are at a standstill are assessed. Additionally or alternatively, in the case of a driving state, that is, if the driver's own commercial vehicle moves at more than 20 km/h, provision may be made for only tire states or sensor states of tire sensor modules which are likewise moving at a speed which corresponds to a vehicle speed of 20 km/h or more, for example, to be assessed.

In both cases, this increases the probability of the output warning signal coming from the driver's own trailer vehicle since the latter is likewise not moving or is moving only slowly or more quickly. This makes it possible to advantageously further reduce the number of warning signals.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
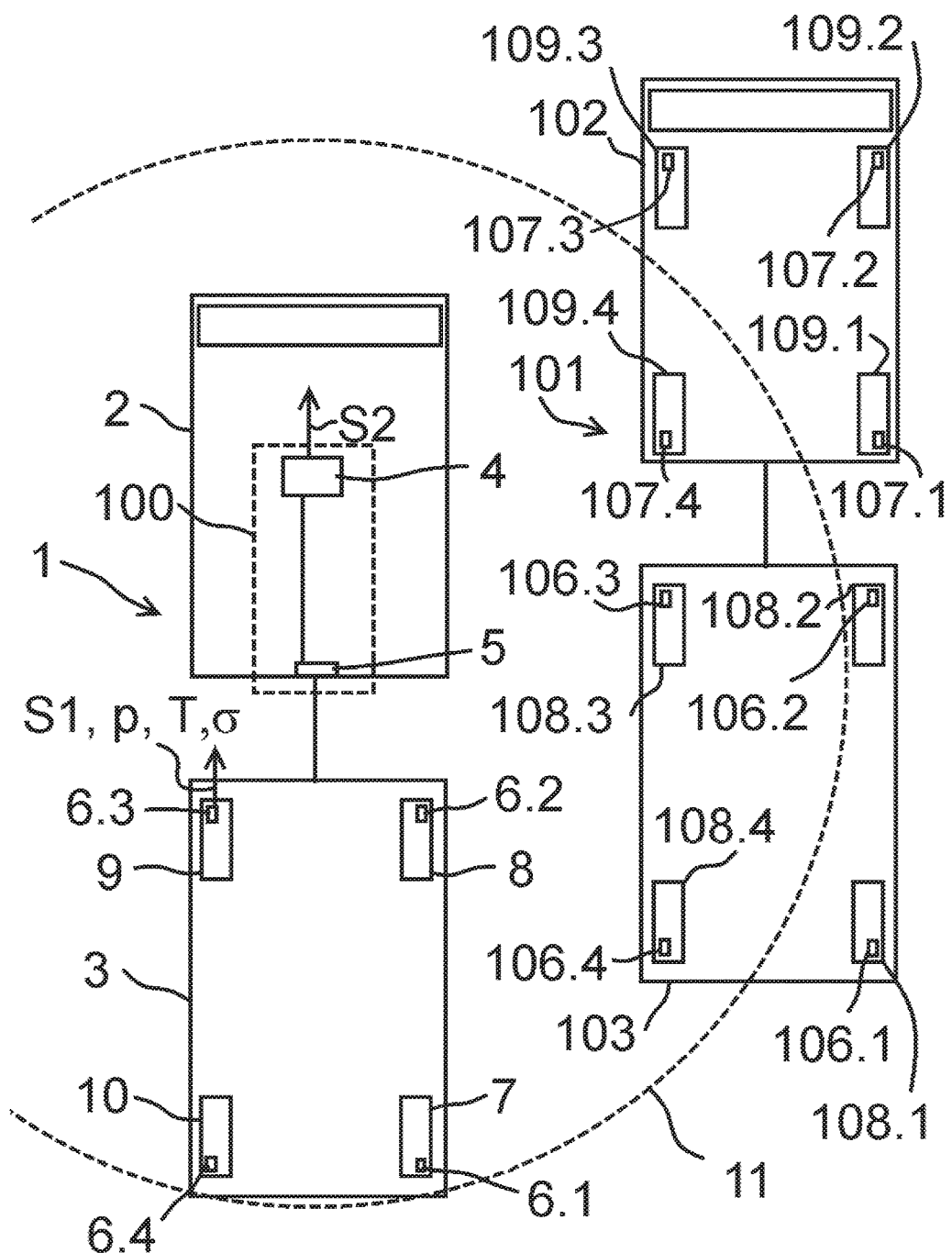
FIG. 1 shows a commercial vehicle having a towing vehicle and a trailer vehicle and an adjacent commercial vehicle; and, FIG. 2 shows a flowchart for monitoring a tire state.

FIG. 1 shows a commercial vehicle 1 having a towing vehicle 2 and a trailer vehicle 3. A control unit 4 (ECU) which is connected to a receiving module 5 is provided on the towing vehicle 2. A receiving module (not illustrated) may likewise be included in the control unit 4. In this case, the receiving module 5 is preferably arranged at a rear end of the towing vehicle 2. The receiving module 5 is configured to receive a data message S1 from tire sensor modules 6.$i$, with i=1 to 4. According to FIG. 1, the tire sensor modules 6.$i$ are arranged, by way of example, only on the tires 7, 8, 9, 10 of the trailer vehicle 3 and each wirelessly output a data message S1, for example via a radio-frequency radio signal. Further tire sensor modules (not illustrated) are arranged on the tires of the towing vehicle 2, the radio signals from which can be received, in particular, by the receiving module 5 and possibly by the further receiving module in the control unit 4. The control unit 4 further processes the signals received by the receiving module 5. In this case, the control unit 4 and the receiving module 5 and possibly the further receiving module in the control unit 4 form a monitoring system 100 for monitoring tire states p, T, σ and critical sensor states using the tire sensor modules 6.$i$ and possibly further tire sensor modules 106.$i$, 107.$i$.

In this case, the tire sensor modules 6.$i$ are each arranged on the tire 7, 8, 9, 10 and can capture tire states, for example a tire pressure p, a tire temperature T and mechanical stresses σ, can process the captured tire states p, T, σ and can wirelessly output them via the data message S1. Furthermore, a sensor identification or a sensor identifier, a critical sensor state, for example a sensor defect or a loose tire sensor module 6.$i$, and a movement state of the respective tire 7, 8, 9, 10 can be output via the data message S1.

If such a tire sensor module 6.$i$ is in a monitoring region 11 of the receiving module 5 or of the control unit 4, the tire sensor module 6.$i$ can be initially captured by the control unit 4 and a check can then be carried out in order to determine whether this tire sensor module 6.$i$ is arranged on one of the tires of the driver's own towing vehicle 2, that is, is already known. This can be carried out on the basis of the sensor identification, for example.

If the captured tire sensor module 6.$i$ is unknown, the data message S1 is evaluated by comparing the tire states p, T, σ transmitted via the data message S1 with limit values GW, the limit values GW specifying percentage deviations from a desired value, for example a desired temperature TSoll or a desired pressure pSoll or a desired stress σSoll. If the limit values GW are undershot or exceeded, that is, there is an excessively low tire pressure p or an excessively high tire temperature T for example, the control unit 4 outputs a warning signal S2 to the driver. If a plurality of unknown tire sensor modules 6.$i$ are captured, the data messages S1 from all tire sensor modules 6.$i$ are evaluated in a parallel manner.

Furthermore, the control device 4 monitors the sensor states transmitted via the data message S1 and outputs a warning signal S2 to the driver if a critical sensor state is detected.

The monitoring region 11 may be 20 to 25 m, for example. This also makes it possible to capture unknown tire sensor modules 106.$i$, 107.$i$ on tires 108.$i$ and 109.$i$ of an adjacent commercial vehicle 101 which has a towing vehicle 102 and a trailer vehicle 103 and is at least partially in the monitoring region 11 according to FIG. 1. So that an excessively large number of warning signals S2 are not output to the driver when evaluating the data messages S1 from all captured and unknown tire sensor modules 6.i, 106.i, 107.i, the limit values GW are stipulated in such a manner that the driver receives a notification only in the case of tire states which are critical to driving. For example, the limit value GW for the tire pressure p can be limited to a value of less than or equal to 80% of the desired pressure pSoll, for example to 20% reduced pressure, that is, 80% of the desired pressure pSoll or GW=0.8×pSoll, as a result of which only slight fluctuations in the tire pressure p which do not result in a critical driving situation do not trigger a warning signal S2. Furthermore, the sensor states in which a warning signal S2 is triggered can also be restricted.

Since it is initially unclear during evaluation immediately after capture whether the unknown tire sensor module 6.i, 106.i, 107.i is arranged on a tire 7, 8, 9, 10 of the driver's own trailer vehicle 3, the driver must himself check, in the event of a warning signal S2, whether this signal comes from a tire sensor module 6.i of his own trailer vehicle 3 or of the adjacent commercial vehicle 101 by checking the tires 7, 8, 9, 10 and 108.i and 109.i.

Automatic trailer detection is additionally carried out in the control unit 4, which detection determines or checks over a period dT whether the received data messages S1 are output by the tire sensor modules 6.i of the driver's own trailer vehicle 3. If a corresponding number of tire sensor modules 6.i have been detected for the driver's own trailer vehicle 3, the trailer detection can be switched off in order to avoid unnecessary warning signals S2.

One embodiment of the method provides for the movement state output by the tire sensor modules 6.i, 106.i, 107.i to be taken into account in the evaluation. In this case, the tire sensor modules 6.i, 106.i, 107.i determine, for example from a prevailing radial acceleration, whether the corresponding tire is moving or is stationary, that is, whether the vehicle with this tire is in a driving state or at a standstill or is moving slowly.

In order to avoid generating unnecessary warning signals S2, it is therefore possible to take into account whether the data messages S1 or the tire states p, T, σ or sensor states are output by tire sensor modules 6.i, 106.i, 107.i which have the same movement state as the driver's own towing vehicle 2. Therefore, in the case of a towing vehicle 2 which is parked, is at a standstill or is moving slowly, all tire sensor modules 6.i, 106.i, 107.i which are moving at a speed corresponding to a vehicle speed of 20 km/h or more, for example, can be excluded from the evaluation. Additionally or alternatively, in the case of a towing vehicle 2 moving at more than 20 km/h, all tire sensor modules 6.i, 106.i, 107.i which are not moving or are moving only slowly can be excluded in the evaluation.

Figure 2:
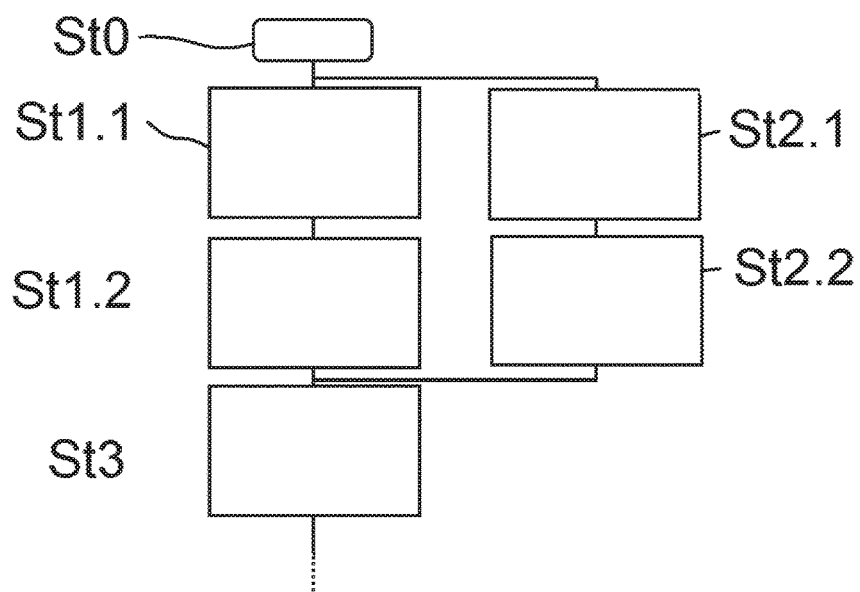

A method according to the invention can, for example, be carried out as follows according to FIG. 2:

In a step St0, the method begins, for example, with the starting of the commercial vehicle 1 or after the commercial vehicle 1 has not been driven for a particular time of 15 minutes, for example. After step St0, the method branches, the automatic trailer detection, that is, the determination of whether or not an unknown tire sensor module 6.i, 106.i, 107.i is assigned to the driver's own trailer vehicle 3, being carried out in a first branch, and the tire states p, T, σ or sensor states being monitored according to the invention in a second branch running parallel thereto.

In the first branch, a first step St1.1 captures whether the driver's own commercial vehicle 1 is moving. If this is not the case, the data messages S1 received from the at least one unknown tire sensor module 6.i, 106.i, 107.i in the monitoring region 11 are discarded since the automatic trailer detection is carried out only in the case of a moving commercial vehicle 1. No warning signals S2 are accordingly output either.

If a movement of the driver's own commercial vehicle 1 is captured, the sensor identification(s) of the unknown tire sensor module or of all unknown tire sensor modules 6.i, 106.i, 107.i transmitted via the data message S1 is/are collected and counted over a period dT in a second step St1.2 of this branch, only moving tire sensor modules 6.i, 106.i, 107.i being taken into account for this purpose. No warning signals S2 are output in the meantime.

In the second branch, the data messages S1 from the unknown tire sensor modules 6.i, 106.i, 107.i are already evaluated in a parallel manner when the commercial vehicle 1 is stationary in a first step St2.1. For this purpose, the tire states p, T, σ transmitted via the data message S1 are each compared with a limit value GW and the sensor states are monitored for critical sensor states. If the limit value GW is accordingly exceeded or undershot or if there is a critical sensor state, warning signals S2 are output. According to this embodiment, only tire sensor modules 6.i, 106.i, 107.i which are likewise not moving are evaluated in this case.

In addition, in a step St2.2, the data messages S1 from the unknown tire sensor modules 6.i, 106.i, 107.i are also evaluated when the commercial vehicle 1 is moving by comparing each of the transmitted tire states p, T, σ with a limit value GW or by monitoring the sensor state. If the limit value GW is accordingly exceeded or undershot, warning signals S2 are output. Warning signals S2 are likewise output if the sensor state indicates a defect, for example. According to this embodiment, only tire sensor modules 6.i, 106.i, 107.i which are likewise moving are evaluated in this case.

After steps St1.2 and St2.2, the branches converge again. After these steps, the automatic trailer detection has been concluded. Accordingly, after the tire sensor modules 6.i have been assigned to the driver's own trailer vehicle 3, the automatic trailer detection is concluded in step St3 and the tire sensor modules 6.i which are now known are permanently monitored, for example, until the automatic trailer detection is restarted.

Alternatively, provision may be made for the data messages S1 to not yet be used in step St2.1. That is, in a method according to the invention for monitoring tire states and sensor states, warning signals S2 are output only in the driving state if the limit value is exceeded or undershot and/or a critical sensor state has been determined, only tire sensor modules 6.i, 106.i, 107.i which are likewise moving being taken into account according to this embodiment.

It is understood that the foregoing description is that of the preferred embodiments of the invention and that various changes and modifications may be made thereto without departing from the spirit and scope of the invention as defined in the appended claims.

LIST OF REFERENCE SIGNS

1 Driver's own commercial vehicle
2 Towing vehicle
3 Trailer vehicle
4 Control unit
5 Receiving module
6.i Tire sensor modules
7, 8, 9, 10 Tires of the trailer vehicle 3
11 Monitoring region
100 Monitoring system 101 Adjacent commercial vehicle
102 Towing vehicle of 101
103 Trailer vehicle of 101
106.i Tire sensor modules on 103
107.i Tire sensor modules on 102
108.i Tires of the adjacent trailer vehicle 103
109.i Tires of the adjacent towing vehicle 102
dT Period
GW Limit values
p Tire pressure
pSoll Desired pressure
T Tire temperature
TSoll Desired temperature
σ Mechanical stress state
σSoll Desired stress
S1 Data message
S2 Warning signals
St0, St1.1, St1.2, St2.1, St2.2, St3 Method steps

What is claimed is:

1. A method for monitoring at least one of tire states and sensor states, the method comprising the steps of:
   a) capturing whether at least one tire sensor module for measuring at least one of the tire states and sensor states is present in a monitoring region;
   b) determining whether the at least one captured tire sensor module is unknown;
   c) evaluating data messages (S1) from the at least one captured and unknown tire sensor module, the evaluation comprising at least one of comparing at least one tire state transmitted via a data message (S1) with a limit value (GW) therefor and monitoring a sensor state of the tire sensor module transmitted via the data message (S1); and,
   d) outputting a warning signal (S2) if at least one of:
      one of said tire states exceeds or undershoots the respective limit value (GW) in order to indicate that a tire state of a tire assigned to the at least one unknown tire sensor module is critical;
      a critical sensor state is detected;
      determining whether the at least one captured and unknown tire sensor module belongs to a trailer vehicle of a driver's own commercial vehicle;
      monitoring a number of output data messages (S1) from the at least one captured and unknown tire sensor module in a period (dT) for the purpose of said determining whether at least one captured and unknown tire sensor module belongs to a trailer vehicle of a driver's own commercial vehicle; and,
   wherein the data messages (S1) are already evaluated in step c) before it has been determined whether the at least one captured tire sensor module belongs to the driver's own trailer vehicle.

2. A monitoring system for monitoring at least one of tire states and sensor states, the monitoring system comprising:
   a control unit;
   a receiving module;
   said control unit being configured to capture, via said receiving module, whether at least one tire sensor module for measuring tire states is present in a monitoring region of said receiving module;
   said control unit being further configured to determine whether the at least one captured tire sensor module is unknown to the control unit;
   said control unit being further configured to evaluate a data message (S1) from the captured and unknown tire sensor module, said evaluation comprising at least comparing at least one tire state transmitted via the data message (S1) with a limit value (GW) therefor and/or monitoring a sensor state of the tire sensor module; and,
   said control unit being further configured to output a warning signal (S2) if at least one of:
      a tire state exceeds or undershoots said limit value (GW) in order to indicate that a tire state of a tire assigned to the tire sensor module is critical,
      there is a critical sensor state;
   said control unit being also configured to determine whether a captured and unknown tire sensor module belongs to a trailer vehicle of a driver's own commercial vehicle;
   said control unit being configured to monitor a number of data messages (S1) output by the captured and unknown tire sensor module in a period (dT) for the purpose of determining whether a captured and unknown tire sensor module belongs to the trailer vehicle of the driver's own commercial vehicle; and,
   said control unit being further configured to carry out the evaluation before it has been determined whether the captured tire sensor module belongs to the trailer vehicle of the driver's own commercial vehicle.

* * * * *